United States Patent
Fukazawa

(10) Patent No.: US 10,150,678 B2
(45) Date of Patent: *Dec. 11, 2018

(54) METHOD FOR PRODUCING ALPHA-LITHIUM ALUMINATE

(71) Applicant: NIPPON CHEMICAL INDUSTRIAL CO., LTD., Tokyo (JP)

(72) Inventor: Junya Fukazawa, Tokyo (JP)

(73) Assignee: NIPPON CHEMICAL INDUSTRIAL CO., LTD., Tokyo (JP)

(*) Notice: Subject to any disclaimer, the term of this patent is extended or adjusted under 35 U.S.C. 154(b) by 37 days.

This patent is subject to a terminal disclaimer.

(21) Appl. No.: 15/328,746

(22) PCT Filed: Jul. 22, 2015

(86) PCT No.: PCT/JP2015/070793
§ 371 (c)(1),
(2) Date: Jan. 24, 2017

(87) PCT Pub. No.: WO2016/013567
PCT Pub. Date: Jan. 28, 2016

(65) Prior Publication Data
US 2017/0210633 A1    Jul. 27, 2017

(30) Foreign Application Priority Data

Jul. 25, 2014 (JP) ................ 2014-152398

(51) Int. Cl.
*C01F 7/04* (2006.01)
*H01M 8/0236* (2016.01)
*H01M 8/14* (2006.01)

(52) U.S. Cl.
CPC ........... *C01F 7/043* (2013.01); *H01M 8/0236* (2013.01); *H01M 8/145* (2013.01); *C01P 2002/72* (2013.01); *C01P 2004/03* (2013.01); *C01P 2006/12* (2013.01); *C01P 2006/32* (2013.01); *H01M 2008/147* (2013.01); *Y02E 60/526* (2013.01)

(58) Field of Classification Search
CPC . C01F 7/043; H01M 8/145; H01M 2008/147; C01P 2002/72; C01P 2006/12
See application file for complete search history.

(56) References Cited

U.S. PATENT DOCUMENTS

| 6,340,454 | B1 | 1/2002 | Nakaoka et al. |
| 9,731,977 | B2 * | 8/2017 | Fukazawa .............. C01F 7/043 |
| 2010/0233073 | A1 | 9/2010 | Hyun et al. |

FOREIGN PATENT DOCUMENTS

| JP | 2-80319 A | 3/1990 |
| JP | 2-243511 A | 9/1990 |
| JP | 9-110421 A | 4/1997 |
| JP | 9-110422 A | 4/1997 |
| JP | 10-112329 A | 4/1998 |
| JP | 2000-109316 A | 4/2000 |
| JP | 2000109316 A | * 4/2000 |
| JP | 2000-195531 A | 7/2000 |
| JP | 2004-149360 A | 5/2004 |
| JP | 2007-320837 A | 12/2007 |
| JP | 2014-169219 A | 9/2014 |

OTHER PUBLICATIONS

International Search Report dated Aug. 25, 2015, issued in counterpart International Application No. PCT/JP2015/070793 (2 pages).
International Search Report dated Mar. 4, 2014, issued in counterpart International Application No. PCT/JP2014/052650.

* cited by examiner

*Primary Examiner* — Anthony J Zimmer
(74) *Attorney, Agent, or Firm* — Westerman, Hattori, Daniels & Adrian, LLP

(57) ABSTRACT

The objective of the present invention is to provide, in an industrially advantageous method, α-lithium aluminate which has various favorable physical properties as a MCFC electrolyte holding plate with excellent heat stability and chemical stability, even when the α-lithium aluminate is minute with the BET specific surface area being 10 m2/g or greater. A method for producing α-lithium aluminate is characterized by mixing hydrated alumina and lithium carbonate in an Al/Li molar ratio of 0.95-1.01 and subjecting the obtained mixture (a) to a first firing reaction to obtain a fired product, and then subjecting a mixture (b) which is the obtained fired product to which an aluminum compound is added to a second firing reaction.

7 Claims, 2 Drawing Sheets

METHOD FOR PRODUCING ALPHA-LITHIUM ALUMINATE

TECHNICAL FIELD

The present invention relates particularly to α-lithium aluminate ($LiAlO_2$) useful for an electrolyte matrix of a molten carbonate fuel cell (MCFC), and a method for producing the same.

BACKGROUND ART

Electrolyte matrices for MCFCs are used for the purpose of supporting a mixed molten carbonate salt of lithium carbonate ($Li_2CO_3$), potassium carbonate ($K_2CO_3$), sodium carbonate ($Na_2CO_3$) and the like in a high-temperature region around 650° C. Hence, the electrolyte matrices require a high supporting property for the molten carbonate salts, as well as properties such us particle shape stability, alkali resistance and thermal stability. As a constituent material meeting such required properties of the electrolyte matrices, lithium aluminate has been used; particularly, a fine γ-lithium aluminate has been suitably used which is excellent in the electrolyte supporting capacity and relatively large in the specific surface area.

Further, it is known that a fine α-lithium aluminate also is useful as electrolyte matrices for MCFCs. Patent Literature 1 discloses a method for producing a high-crystalline α-lithium aluminate. Further, Patent Literature 2 discloses a method of subjecting an alumina powder having a specific surface area of 100 $m^2/g$ or larger and a mixture of carbonate salts including lithium carbonate to heat treatment in a molten carbonate salt at 700 to 800° C. Further, Patent Literature 3 discloses a method of subjecting an aluminum hydroxide powder having a specific surface area of 100 $m^2/g$ or larger and a mixture of carbonate salts including lithium carbonate to heat treatment in a molten carbonate salt at 700 to 800° C.

In any of the above methods, alumina or lithium aluminate as a raw material is heat-treated in a molten carbonate salt. Such methods not only need to take as long a reaction time as 50 hours to 100 hours, but due to the character of the production methods, further need to inevitably comprise a step of cleaning and drying products in order to remove the carbonate salts, which cannot avoid the complexity and the high cost of the steps.

Further, Patent Literature 4 proposes to produce α-lithium aluminate by dry mixing and firing a porous γ-alumina and a lithium compound in an approximately stoichiometric molar ratio of Li/Al. When a fine α-lithium aluminate having a BET specific surface area of 10 $m^2/g$ or larger is produced by this production method, however, it can hardly have any thermal stability and chemical stability necessary for electrolyte matrices for MCFCs.

CITATION LIST

Patent Literature

Patent Literature 1: Japanese Patent Laid-Open No. 2-80319
Patent Literature 2: Japanese Patent Laid-Open No. 2-243511
Patent Literature 3: Japanese Patent Laid-Open No. 10-112329
Patent Literature 4: Japanese Patent Laid-Open No. 2000-195531

SUMMARY OF INVENTION

Technical Problem

Under such background, there has been demanded the development of an α-lithium aluminate which particularly has a BET specific surface area of 10 $m^2/g$ or larger, and is excellent in the high supporting property and thermal stability and chemical stability meeting the purpose of improving the life elongation of MCFCs.

As a result of exhaustive studies to solve the above problematic point, the present inventors have found that an alumina hydrate is used; the alumina hydrate and lithium carbonate are mixed in a molar ratio of Al/Li of about 1; the obtained mixture (a) is subjected to a first firing reaction; then, a mixture (b) obtained by adding an aluminum compound to the obtained fired product is subjected to a second firing reaction to thereby produce an α-lithium aluminate, which, even in the case of being a fine product having a BET specific surface area of 10 $m^2/g$ or larger, is excellent in thermal stability and chemical stability and has various physical properties suitable as an electrolyte matrix for MCFCs. This finding has led to the completion of the present invention.

The present invention has been completed based on the above finding, and the subject to be attained for the object of the present invention is to provide, by an industrially advantageous method, an α-lithium aluminate which, particularly even in the case of being a fine product having a BET specific surface area of 10 $m^2/g$ or larger, has various physical properties suitable as an electrolyte matrix for MCFCs excellent in thermal stability and chemical stability in a molten carbonate salt of the MCFCs.

Solution to Problem

More specifically, the present invention provides a method for producing an α-lithium aluminate, the method comprising mixing an alumina hydrate and lithium carbonate in a molar ratio of Al/Li of 0.95 to 1.01, subjecting the obtained mixture (a) to a first firing reaction to thereby obtain a fired product, and then, subjecting a mixture (to) obtained by adding an aluminum compound to the obtained fired product, to a second firing reaction.

Further, the present invention provides a method for producing an α-lithium aluminate, wherein the mixture (b) is obtained by adding an aluminum compound to the obtained fired product in a molar ratio (Al/Li) of Al atoms in the aluminum compound to Li atoms in the obtained fired product of 0.001 to 0.05.

Further, the present invention provides a method for producing α-lithium aluminate, wherein in the first firing reaction, the firing temperature is 650 to 850° C.

Further, the present invention provides a method for producing α-lithium aluminate, wherein in the second firing reaction, the firing temperature is 750 to 900° C.

Further, the present invention provides a method for producing an α-lithium aluminate, wherein the alumina hydrate is boehmite.

Further, the present invention provides a method for producing an α-lithium aluminate, wherein the BET specific surface area of the alumina hydrate is 50 $m^2/g$ or larger.

Further, the present invention provides a method for producing an α-lithium aluminate, wherein the aluminum compound is a transition alumina or an alumina hydrate.

Further, the present invention provides a method for producing α-lithium aluminate to be used as an electrolyte matrix for a molten carbonate fuel cell.

Advantageous Effects of Invention

The present invention, since being constituted as described above, can provide, by an industrially advantageous method, an α-lithium aluminate, which, particularly even in the case of being a fine product having a BET specific surface area of 10 $m^2/g$ or larger, has various physical properties suitable as an electrolyte matrix for MCFCs excellent in thermal stability and chemical stability.

DESCRIPTION OF EMBODIMENTS

Figure 1:
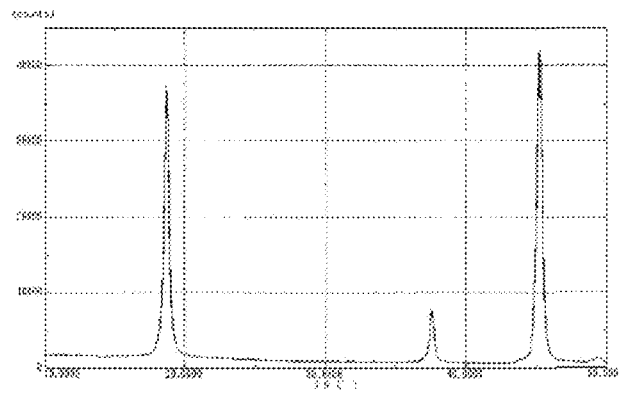
FIG. 1 is an X-ray diffraction diagram of a fired product (α-lithium aluminate (1)) obtained after a first firing reaction in Example 1.

Hereinafter, the present invention will be described based on preferred embodiments.

It is one of features that, an α-lithium aluminate (hereinafter, referred to as "α-lithium aluminate (2)" in some cases) obtained by the present production method is an α-lithium aluminate (2) containing substantially no γ-lithium aluminate and in a single phase by X-ray diffraction analysis.

It is also one of features that an α-lithium aluminate (2) obtained in the present production method is an α-lithium aluminate (2) containing substantially no γ-lithium aluminate in X-ray diffraction analysis and being excellent in thermal stability even after a sample of the α-lithium aluminate (2) is heated in the air atmosphere at 750° C. for 200 hours.

It is also one of features that an α-lithium aluminate (2) obtained in the present production method is an α-lithium aluminate (2) containing substantially no γ-lithium aluminate in X-ray diffraction analysis and excellent in chemical stability even after being heated in an electrolyte (component composition: $Li_2CO_3:K_2CO_3$=53:47 mol %) at 750° C. for 200 hours.

Further, the BET specific surface area of the α-lithium aluminate (2) obtained in the present production method is not especially limited, but in consideration of the advantageous effect of the α-lithium aluminate (2) obtained in the present production method, the BET specific surface area is 10 $m^2/g$ or larger, and preferably 10 to 40 $m^2/g$.

The method for producing the α-lithium aluminate (2) relevant to the present invention comprises mixing a alumina hydrate and lithium carbonate in a molar ratio of Al/Li of about 1, subjecting the obtained mixture (a) to a first firing reaction to thereby obtain a fired product (hereinafter, referred to as "α-lithium aluminate (1)" in some cases), and then, subjecting a mixture (b) obtained by adding an aluminum compound to the obtained fired product, to a second firing reaction; and the present production method basically comprises the following steps of (a) to (d):

(a): a mixture (a) preparation step;
(b): a first firing reaction step;
(c): a mixture (b) preparation step; and
(d): a second firing reaction step.

(a): The Mixture (a) Preparation Step

The mixture (a) preparation step is a step of preparing a homogeneous mixture (a) in which an alumina hydrate and lithium carbonate are mixed in a molar ratio of Al/Li of about 1 ranging from 0.95 to 1.01.

The alumina hydrate relevant to the mixture (a) preparation step is represented by the general formula: $Al_2O_3 \cdot nH_2O$, and also includes aluminum hydroxide.

The alumina hydrate is, depending on the composition and the crystal structure, classified into gibbsite, bayerite, norstrandite, boehmite, boehmite gel (pseudo boehmite), diaspore, amorphous alumina hydrates and the like. For example, an alumina hydrate in the case where the value of n is 1 in the formula of the alumina hydrate is usually classified as an alumina hydrate having a boehmite structure; an alumina hydrate in the case where the value of n is more than 1 and less than 3 therein, as an alumina hydrate having a pseudo boehmite structure; and an alumina hydrate in the case where the value of n is 3 or more therein, as an alumina hydrate having an amorphous structure. Here, the value of n of diaspore is 1; and the value of n of gibbsite, bayerite and norstrandite is 3. Apart from these classifications, aluminum hydroxide has a value of n of 3 to 5. Further, an alumina sol in which an alumina hydrate is colloidally suspended and dispersed in water can also be used.

In the present production method, as the alumina hydrate, boehmite is especially preferably used particularly from the viewpoint of being capable of providing an α-lithium aluminate excellent also in thermal stability and chemical stability.

With respect to preferable physical properties of the alumina hydrate relevant to the mixture (a) preparation step, the BET specific surface area is, from the viewpoint of producing an α-lithium aluminate (2), 10 $m^2/g$ or larger, preferably 10 to 40 $m^2/g$, preferably 50 $m^2/g$ or larger, and more preferably 60 to 200 $m^2/g$.

Further, the alumina hydrate may be in any shape such as fibrous, acicular, globular, rod-like, powdery, and granular.

The production method itself of such an alumina hydrate is well known, and the alumina hydrate is obtained by well-known methods, for example, hydrolysis of an aluminum alkoxide such as aluminum isopropoxide, neutralization of an aluminum salt with an alkali, or hydrolysis of an aluminate salt. The aluminum alkoxide includes isopropoxide and 2-butoxide (see, for example, Japanese Patent Laid-Open Nos. 57-88074, 62-56321, 2-64010, 4-275917, 6-64918, 7-10535 and 7-267633, National Publication of International Patent Application Nos. 2002-522343 and 2003-507299, and U.S. Pat. No. 2,656,321). In the case of using an inorganic salt of aluminum or its hydrate as a raw material, examples of the raw material include inorganic salts such as aluminum chloride, aluminum nitrate, aluminum sulfate, polyaluminum chloride, ammonium alum, sodium aluminate, potassium aluminate and aluminum hydroxide, and hydrates thereof (see, tor example, Japanese Patent Laid-Open Nos. 54-116398, 55-23034, 55-27824 and 56-120508).

Further, as the alumina hydrate to be used in the present invention, commercially available ones can suitably be used.

The lithium carbonate relevant to the mixture (a) preparation step is not especially limited in the physical properties and the like as long as being industrially available, but from the viewpoint of making good the reactivity with the alumina hydrate, there is preferably used lithium carbonate having an average particle size of 15 μm or smaller, preferably 10 μm or smaller, as determined by the laser method.

In the mixture (a) preparation step, the alumina hydrate and the lithium carbonate, in order to obtain the α-lithium aluminate (1), are mixed in a molar ratio of Al/Li of 0.95 to 1.01, preferably 0.97 to 1.00.

The reason is that if the molar ratio of Al/Li is out of the above range, α-lithium aluminate (1) having the target composition and in a single phase by X-ray diffractometry is difficult to obtain, and through the subsequent steps it also becomes difficult to obtain an α-lithium aluminate (2) excellent in thermal stability and chemical stability.

A mixing method of the alumina hydrate and the lithium carbonate relevant to the mixture (a) preparation step may be of a dry type or a wet type, and is not especially limited.

In the case of dry mixing, when mutual dispersion among the powders is insufficient, in the first firing reaction step of (b), the α-lithium aluminate (1) particles partially aggregate and changes into coarse particles. Hence, in order to obtain the state of raw materials being homogeneously mixed and dispersed, it is preferable that the process is carried out using a high-speed dispersion and mixing machine, for example, a Henschel Mixer or a Super Mixer.

In the case of wet mixing, when a slurry is filtered, lithium carbonate dissolved in water is transferred into the filtrate, and thus it becomes difficult to obtain the α-lithium aluminate (1) as the target composition. Hence, it is preferable that the slurry containing raw materials blended in approximately stoichiometric equivalent ratios is dried as the whole amount by a spray drier.

(b): The First Firing Reaction Step

The mixture (a) obtained in the mixture (a) preparation step of the above (a) is subjected to the first firing reaction step of (b) to thereby obtain a fired product.

The fired product itself obtained by the first firing reaction is an α-lithium aluminate (1), but this α-lithium aluminate (1) itself obtained by the first firing reaction is lower in thermal stability and chemical stability, particularly if it has a BET specific surface area of 10 m$^2$/g or larger, preferably 10 to 40 m$^2$/g, than an α-lithium aluminate (2) produced by the second firing reaction as described later. In the present production method, however, by subjecting the fired product (α-lithium aluminate (1)) obtained by the first firing reaction to the mixture (b) preparation step of (c) and the second firing reaction step of (d) as described later, the α-lithium aluminate (1) can be converted to the α-lithium aluminate (2) excellent in thermal stability and chemical stability.

In the first firing reaction step, it is particularly important from the viewpoint of providing the α-lithium aluminate (2) excellent in thermal stability and chemical stability to obtain an α-lithium aluminate (1) of a single phase by X-ray diffraction analysis of the fired product.

The firing temperature relevant to the first firing reaction step is 650 to 850° C., and preferably 700 to 800° C. The reason therefor is because a firing temperature of the first firing reaction of lower than 650° C. hardly gives a single-phase lithium aluminate (1); and on the other hand, a firing temperature of the first firing reaction of higher than 800° C. is likely to make lithium aluminate (1) having an α phase and a γ phase mixedly present, which are unpreferable.

Here, with respect to the relationship between the firing temperature and the firing time, even if the same raw material mixture is reacted at the same temperature, different crystal forms of lithium aluminate (1) may be obtained depending on the firing time. Generally, firing for a longer time is more liable to partially form a γ form other than α form. Further, with respect to this tendency, a higher firing temperature is likely to produce the γ form in a shorter time. Hence, it is preferable to carry out the firing while whether or not a single-phase α-lithium aluminate (1) is obtained is checked by suitably carrying out the X-ray diffraction analysis. Carrying out the firing for 0.5 to 40 hours at the above-mentioned firing temperature can usually produce the single-phase α-lithium aluminate (1) as the fired product.

The firing atmosphere is not especially limited, and may be any of an inert gas atmosphere, a vacuum atmosphere, an oxidative gas atmosphere, a carbon dioxide gas atmosphere and the air.

The first firing reaction, as desired, may be carried out any number of times. After the completion of the first firing reaction, the obtained fired product, as required, may further be crushed and/or disintegrated.

(c): The Mixture (b) Preparation Step

The fired product obtained by the first firing reaction step of the above (b) is subjected to the mixture (b) preparation step of (c) to thereby obtain a mixture (b) in which the fired product and an aluminum compound are homogeneously mixed.

Examples of the aluminum compound relevant to the mixture (b) preparation step include alumina hydrates such as gibbsite, bayerite, norstrandite, boehmite, boehmite gel (pseudo boehmite), diaspore, amorphous alumina hydrates and aluminum hydroxide; transition aluminas such as γ-alumina, δ-alumina and θ-alumina; transition aluminas of a mixed phase containing two or more of a γ phase, a δ phase, a θ phase and an α phase; aluminum salts of organic acids; ammonium dawsonite; and alum, and among these, the transition aluminas and the alumina hydrates are preferable, and there can preferably be used the alumina hydrates exemplified in the mixture (a) preparation step of the above-mentioned (a). Here, when an alumina hydrate is used, the kind of the alumina hydrate is not especially limited, and may be the same as used in the above-mentioned mixture (a) preparation step or may be different therefrom.

Further, the BET specific surface area of the aluminum compound relevant to the mixture (b) preparation step is, from the viewpoint of providing an α-lithium aluminate (2) excellent in thermal stability and chemical stability, 50 m$^2$/g or larger, and preferably 60 to 200 m$^2$/g.

Further, the aluminum compound can be added to the fired product in the form of a powder, a solution or a slurry in which the aluminum compound is dispersed in a water medium.

In the mixture (b) preparation step, the loading of the aluminum compound is 0.001 to 0.05 in a molar ratio (Al/Li) of Al atoms in the aluminum compound to Li atoms in the fired product, and preferably 0.002 to 0.02.

The reason is if the loading of the aluminum compound is smaller than 0.001 in a molar ratio (Al/Li) of Al atoms in the aluminum compound to Li atoms in the fired product, the α-lithium aluminate (2) tends to be poor in thermal stability and chemical stability; on the other hand, if the loading is larger than 0.05 in a molar ratio of Al/Li, the α-lithium aluminate (2) tends to contain unreacted substances.

As mixing means of the fired product and the aluminum compound, a method can be used without no especial limitations as long as being capable of providing a mixture (b) in which the each raw material is homogeneously dispersed; and for example, there can be used the same method as in the mixture (a) preparation step of the above-mentioned (a). Specifically, there can be used a method of processing in a dry state using a high-speed dispersion and mixing machine, for example, a Henschel Mixer or a Super Mixer, and in the case of mixing in a wet state, a method in which a slurry is dried as the whole amount by a spray drier.

(d): The Second Firing Reaction Step

The mixture (b) obtained in the mixture (b) preparation step of the above (c) is subjected to the second firing reaction step to thereby obtain α-lithium aluminate (2) as a target of the present invention.

In the present production method, by carrying out the second firing reaction on the mixture (b) homogeneously mixed, there can be obtained the α-lithium aluminate (2) for more improved in thermal stability and chemical stability than the fired product (α-lithium aluminate (1)) obtained by the first firing reaction.

In the second firing reaction step of the (d), it is particularly important from the viewpoint of obtaining an α-lithium aluminate (2) excellent in thermal stability to obtain a single-phase α-lithium aluminate (2).

The firing temperature relevant to the second firing reaction step is 750 to 900° C., and preferably 770 to 830° C. The reason therefor is because a firing temperature of the second firing reaction of lower than 750° C. hardly gives a single-phase lithium aluminate (2) in the X-ray diffractometry; and on the other hand, a firing temperature of the second firing reaction of higher than 830° C. is likely to make a lithium aluminate (2) containing a γ phase, which are unpreferable.

Here, with respect to the relationship between the firing temperature and the firing time, even if the same raw material mixture is reacted at the same temperature, different crystal forms of lithium aluminate (2) may be obtained depending on the firing time. Generally, firing for a longer time is more liable to partially form a γ form other than α form. Further, with respect to this tendency, a higher firing temperature is likely to produce the γ form in a shorter time. Hence, it is preferable to carry out the firing while whether or not a single-phase α-lithium aluminate (2) is obtained is checked by suitably carrying out the X-ray diffraction analysis. Carrying out the firing for 0.5 to 40 hours at the above-mentioned firing temperature can usually produce α-lithium aluminate exhibiting satisfactory performance and being of a single phase.

The firing atmosphere is not especially limited, and may be any of an inert gas atmosphere, a vacuum atmosphere, an oxidative gas atmosphere, a carbon dioxide gas atmosphere and the air.

The second firing reaction, as desired, may be carried out any number of times. After the completion of the second firing reaction, the obtained fired product is, as required, crushed and/or disintegrated to thereby make a product.

The α-lithium aluminate (2) obtained in the production method according to the present invention is an α-lithium aluminate (2) containing substantially no γ-lithium aluminate and in a single phase in X-ray diffraction, and even in the case of the α-lithium aluminate (2) having a BET specific surface area of 10 m$^2$/g or larger, is excellent in thermal stability and chemical stability. Hence, the α-lithium aluminate (2) obtained by the production method according to the present invention, even in the case of a product having a BET specific surface area of 10 m$^2$/g or larger, can suitably be used as an electrolyte matrix for MCFCs.

EXAMPLES

Hereinafter, the present invention will be described specifically in comparison of Examples of the present invention with Comparative Examples. However, the scope of the present invention is not limited to these Examples.

Example 1

(a): A Mixture (a) Preparation Step

A commercially available boehmite having a BET specific surface area of 135 m$^2$/g and an average particle size determined by the laser method of 30 μm, and a lithium carbonate having an average particle size determined by the laser method of 5 μm were weighed in such amounts that the molar ratio (Al/Li) became 1.00, and fully mixed by a Henschei Mixer to thereby prepare a homogeneous mixture (a).

(b): A First, Firing Reaction Step

The homogeneous mixture (a) was charged in an alumina crucible, and subjected to a first firing reaction at 700° C. for 25 hours in the air atmosphere to thereby obtain a fired product. The obtained fired product was subjected to X-ray diffraction analysis, and was a single-phase α-lithium aluminate (1) (see FIG. 1).

(c): A Mixture (b) Preparation Step

The same boehmite as used in the mixture (a) preparation step was added to the fired product so that the molar ratio (Al/Li) to Li in the α-lithium aluminate (1) became 0.015, and thereafter fully mixed by a Henschel Mixer to thereby prepare a homogeneous mixture (b).

(d): A Second Firing Reaction Step

Figure 2:
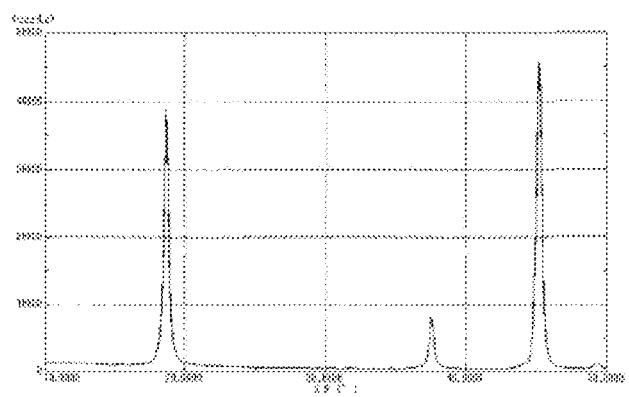
FIG. 2 is an X-ray diffraction diagram of α-lithium aluminate (2) obtained after a second firing reaction in Example 1.
Figure 3:
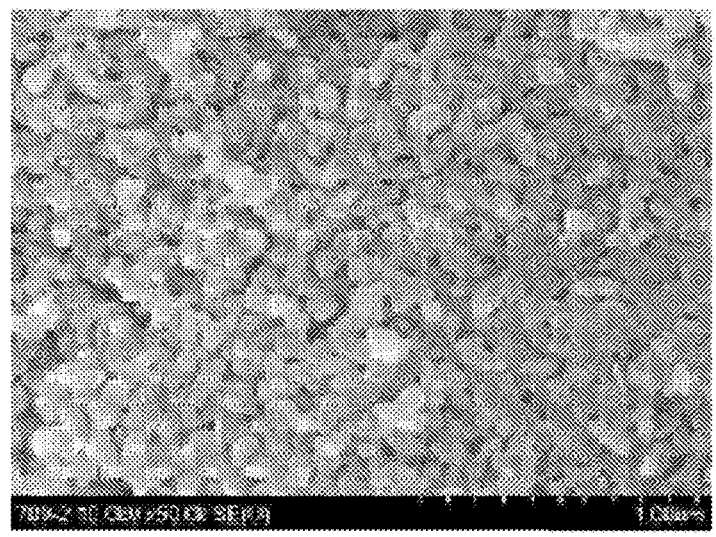
FIG. 3 is a SEM photograph of α-lithium aluminate (2) obtained after a second firing reaction in Example 1.

The homogeneous mixture (b) was charged in an alumina crucible, and subjected to a second firing reaction at 800° C. for 7 hours in the air atmosphere to thereby obtain α-lithium aluminate (2) sample. The obtained α-lithium aluminate (2) sample was subjected to X-ray diffraction analysis, and was α-lithium aluminate single phase (see FIG. 2), and had a BET specific surface area of 23.6 m$^2$/g. A SEM photograph of the α-lithium aluminate (2) sample is shown in FIG. 3.

Example 2

(a): A Mixture (a) Preparation Step

A commercially available boehmite having a BET specific surface area of 152 m$^2$/g and an average particle size determined by the laser method of 30 μm, and a lithium carbonate having an average particle size determined by the laser method of 5 μm were weighed so that the molar ratio (Al/Li) became 1.00, and fully mixed by a Henschel Mixer to thereby prepare a homogeneous mixture (a).

(b): A First Firing Reaction Step

The homogeneous mixture (a) was charged in an alumina crucible, and subjected to a first firing reaction at 700° C. for 25 hours in the air atmosphere to thereby obtain a fired product. The obtained fired product was subjected to X-ray diffraction analysis, and was a single-phase α-lithium aluminate (1).

(c): A Mixture (b) Preparation Step

The same boehmite as used in the mixture (a) preparation step was added to the fired product so that the molar ratio (Al/Li) to Li in the α-lithium aluminate (1) became 0.015, and thereafter fully mixed by a Henschel Mixer to thereby prepare a homogeneous mixture (b).

(d): A Second Firing Reaction Step

The homogeneous mixture (b) was charged in an alumina crucible, and subjected to a second firing reaction at 800° C.

for 7 hours in the air atmosphere to thereby obtain α-lithium aluminate (2) sample. The obtained α-lithium aluminate (2) sample was subjected to X-ray diffraction analysis, and was α-lithium aluminate single phase, and had a BET specific surface area of 28.8 m²/g.

Comparative Example 1

A commercially available boehmite having a BET specific surface area of 108 m²/g and an average particle size determined by the laser method of 30 μm, and a lithium carbonate having an average particle size determined by the laser method of 5 μm were weighed and mixed by the same method as in Example 1 to thereby obtain a homogeneous mixture (a).

Then, the homogeneous mixture (a) was charged in an alumina crucible, and fired at 700° C. for 25 hours in the air atmosphere to thereby make α-lithium aluminate sample. The obtained α-lithium aluminate sample was subjected to X-ray diffraction analysis, and was α-lithium aluminate single phase, and had a BET specific surface area of 19.4 m²/g.

Comparative Example 2

A commercially available boehmite having a BET specific surface area of 108 m²/g and an average particle size determined by the laser method of 30 μm, and a lithium carbonate having an average particle size determined by the laser method of 5 μm were weighed and mixed by the same methods as in Example 1 to thereby obtain a homogeneous mixture (a).

Then, the homogeneous mixture (a) was charged in an alumina crucible, and fired at 740° C. for 7 hours and further at 800° C. for 7 hours, in the air atmosphere to thereby make an α-lithium aluminate sample. The obtained α-lithium aluminate sample was subjected to X-ray diffraction analysis, and was an α-lithium aluminate single phase and had a BET specific surface area of 21.2 m²/g.

TABLE 1

| | (a); Mixture (a) Preparation Step Alumina Hydrate | | | (c); Mixture (b) Preparation Step *Loading of Aluminum Compound: Molar Ratio of (Al/Li) |
|---|---|---|---|---|
| | Kind of Alumina Hydrate | BET Specific Surface Area (m²/g) | Average Particle Size (μm) | |
| Example 1 | Boemite | 135 | 30 | 0.015 |
| Example 2 | Boemite | 152 | 30 | 0.015 |
| Comparative Example 1 | Boemite | 108 | 30 | none |
| Comparative Example 2 | Boemite | 108 | 30 | none | note)
The loading of the aluminum compound is represented by a molar ratio (Al/Li) of Al in the added aluminum compound to Li in the fired product (α-lithium aluminate (1)).

<Evaluation of Stabilities>

The each α-lithium aluminate sample obtained in the Examples and Comparative Examples was evaluated for thermal stability and evaluated for chemical stability.

<Thermal Stability Test>

Figure 4:
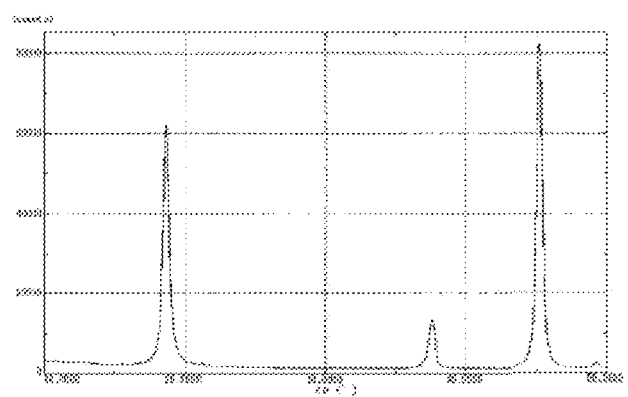
FIG. 4 is an X-ray diffraction diagram after a thermal stability test of α-lithium aluminate (2) obtained in Example 1.
Figure 5:
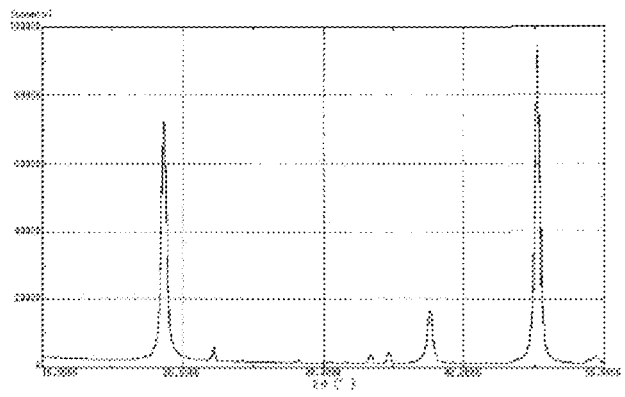
FIG. 5 is an X-ray diffraction diagram after a thermal stability test of α-lithium aluminate obtained in Comparative Example 2.

10 g of the each α-lithium aluminate sample obtained in the Examples and Comparative Examples was put in an electric furnace in the air atmosphere and heated at 750° C. for 200 hours, and subjected to X-ray diffraction analysis to check the presence/absence of γ-lithium aluminate. X-ray diffraction diagrams after the heat treatment of the α-lithium aluminate samples of Example 1 and Comparative Example 2 are shown in FIG. 4 and FIG. 5, respectively.

<Chemical Stability Test>

The each α-lithium aluminate sample obtained in the Examples and Comparative Examples, and an electrolyte (component composition: $Li_2CO_3:K_2CO_3$=53:47 mol %) were mixed in a weight ratio of 1:2 and heated in an electric furnace held in an atmosphere of air/nitrogen/$CO_2$=50/40/10 in volume ratio, at a temperature of 670° C. for 200 hours, and subjected to X-ray diffraction analysis to check the presence/absence of γ-lithium aluminate.

TABLE 2

| | Thermal Stability Test presence/absence of γ Phase | Chemical Stability Test presence/absence of γ Phase |
|---|---|---|
| Example 1 | none | none |
| Example 2 | none | none |
| Comparative Example 1 | present | present |
| Coraparative Example 2 | present | present |

From Table 2, it is clear that the α-lithium aluminate obtained by the present production method was excellent in thermal stability and chemical stability.

INDUSTRIAL APPLICABILITY

The present invention can provide α-lithium aluminate by an industrially advantageous method, which, even in the case of a fine product having a BET specific surface area of 10 m²/g or larger, is excellent in thermal stability and has various physical properties suitable as an electrolyte matrix for MCFCs.

The invention claimed is:

1. A method for producing an α-lithium aluminate, comprising: mixing an alumina hydrate and lithium carbonate in a molar ratio of Al/Li of 0.95 to 1.01; subjecting the obtained mixture (a) to a first firing reaction to thereby obtain a fired product; and then, subjecting a mixture (b) obtained by adding an aluminum compound to the obtained fired product, to a second firing reaction.

2. The method for producing an α-lithium aluminate according to claim 1, wherein the mixture (b) is obtained by adding an aluminum compound to the obtained fired product in a molar ratio (Al/Li) of Al atoms in the aluminum compound to Li atoms in the obtained fired product of 0.001 to 0.05.

3. The method for producing α-lithium aluminate according to claim 1, wherein the first firing reaction uses a firing temperature of 650 to 850° C.

4. The method for producing α-lithium aluminate according to claim 1, wherein the second firing reaction uses a firing temperature of 750 to 900° C.

5. The method for producing an α-lithium aluminate according to claim 1, wherein the alumina hydrate is boehmite.

6. The method for producing an α-lithium aluminate according to claim 1, wherein the alumina hydrate has a BET specific surface area of 50 m²/g or larger.

7. The method for producing an α-lithium aluminate according to claim 1, wherein the aluminum compound is a transition alumina or an alumina hydrate.

* * * * *